Jan. 27, 1953  E. M. DONS ET AL  2,626,820
PIPE COUPLING
Filed May 12, 1947  2 SHEETS—SHEET 1
FIG.1.
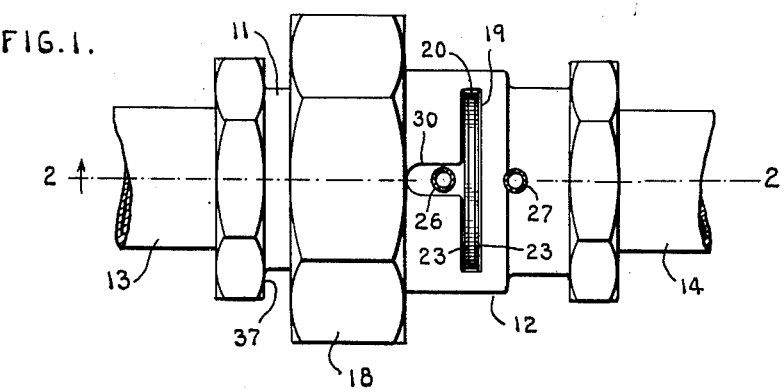
FIG.4.
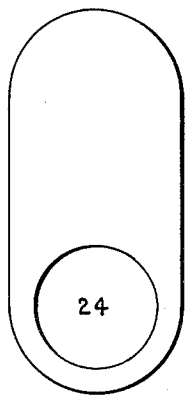
FIG.2.
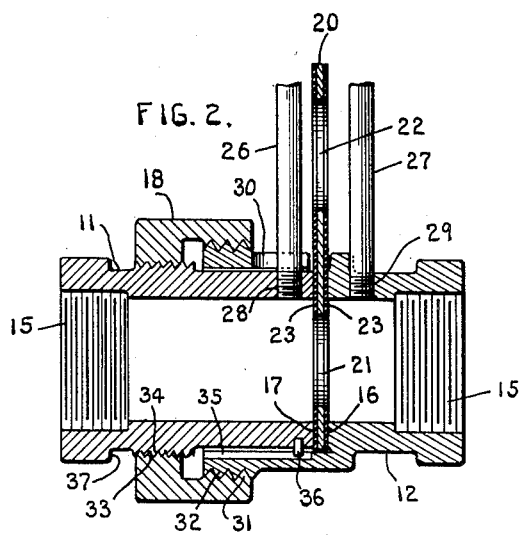
FIG.3.
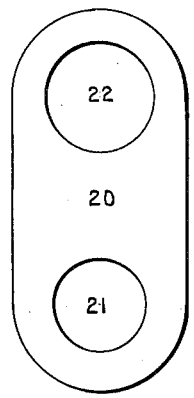
FIG.5.
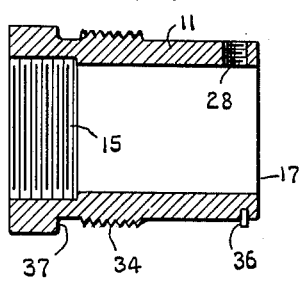
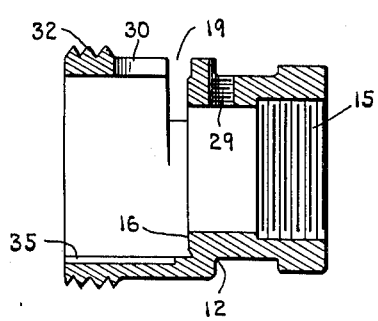
FIG.6.
INVENTORS:
E. M. DONS
J. V. STEVENS
BY Albert J. McCauley
ATTORNEY.

Jan. 27, 1953                E. M. DONS ET AL                2,626,820
                               PIPE COUPLING
Filed May 12, 1947                                        2 SHEETS—SHEET 2
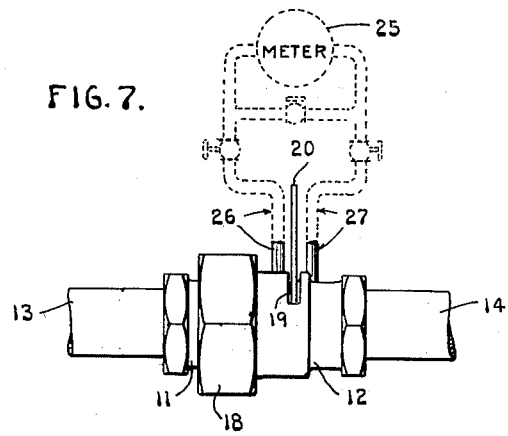
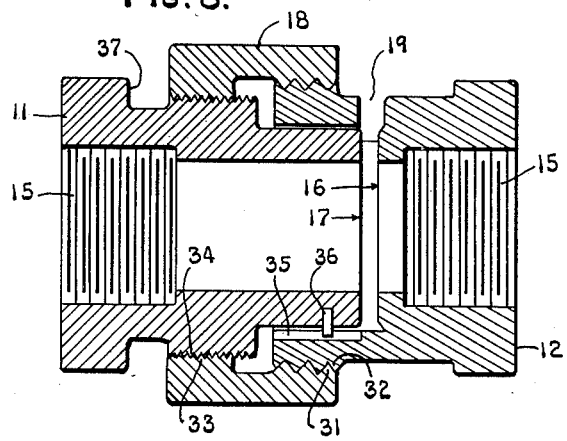
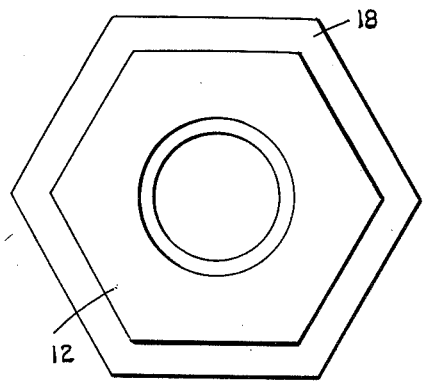
INVENTORS:
E. M. DONS
J. V. STEVENS
BY Albert J. McCauley
ATTORNEY.

Patented Jan. 27, 1953

2,626,820

UNITED STATES PATENT OFFICE 2,626,820

PIPE COUPLING

Eddie M. Dons, Tulsa, and Jesse V. Stevens, Oakhurst, Okla.

Application May 12, 1947, Serial No. 747,490

6 Claims. (Cl. 285—122)

This invention relates to pipe couplings, one of the objects being to produce a commercially desirable coupling of the "union" type adapted to perform the usual function of forming a seal between pipe sections, and having unique cooperating details which advantageously force the pipe sections away from each other during the uncoupling operations.

A separate and distinct object is to produce a desirable novel coupling wherein sealing abutments, movable toward and away from each other, are located at one side of a rotary coupling member, so as to provide for free insertion and removal of a gasket, or plates for either blind or open conditions, when the sealing abutments are separated from each other.

The invention can be employed in the manufacture of a relatively simple union coupling, and it has special advantages as an orifice metering union under conditions wherein it is desirable to provide for convenient changes in the diameter of an orifice between two pipe sections. This phase of the invention extends to specific conditions which enable an orifice meter to be connected to the coupling at opposite sides of a quick-detachable orifice plate.

Furthermore, a commercial advantage for various special types of pipe couplings will appear in our unique cooperative arrangement of simple and inexpensive screw threads. Study of the following disclosure will involve attention to the effects of threads of different pitch which can be conveniently employed to forcibly move the sealing abutments toward and away from each other.

With the foregoing and other objects in view, the invention comprises the novel construction, combination and arrangement of details herein shown and described. However, the scope of the invention extends to various modifications more broadly described by terms employed in the claims hereunto appended.

Fig. 1 is a top view of a pipe coupling embodying features of this invention.

Fig. 2 is a section on the line 2—2 in Fig. 1, with the pipe sections omitted.

Fig. 3 is a detail view of an orifice plate shown in Fig. 2.

Fig. 4 is a similar detail view of a quick-detachable plate adapted for use in changing from a fully open to a blind condition.

Fig. 5 is a detail view of one of the telescoping coupling sleeves shown in Fig. 1 and Fig. 2.

Fig. 6 is a similar detail view of the companion telescoping sleeve.

Fig. 7 is a side view of the coupling device shown in Figures 1 and 2, drawn to a smaller scale, and diagrammatically illustrating an orifice meter connected to the telescoping coupling sleeves.

Fig. 8 is a longitudinal section, similar to Fig. 2, showing a form of the invention wherein the telescoping sleeves are not connected to an orifice meter.

Fig. 9 is an end view of the coupling shown in Fig. 8.

The coupling device shown by Figures 1 to 7 comprises companion coupling sleeves 11 and 12 adapted to be attached to adjacent ends of pipes 13 and 14. For example, the sleeves may be threaded as shown at 15 in Fig. 2, to receive pipes of uniform diameter.

However, the companion coupling sleeves 11 and 12 are preferably telescoped with each other, as shown in Fig. 2. In this form of the invention, the coupling sleeve 12 is provided with an annular internal abutment shoulder 16 (Figures 2 and 6), while the sleeve 11 is provided with an end abutment face 17 shown in Figures 2 and 5. When the sleeves are telescoped with each other (Fig. 2) the internal abutment shoulder 16 lies directly opposite the annular abutment face 17 at the inner end of the sleeve 11. Under these conditions, the telescoping sleeves 11 and 12 may be forced toward each other to form a seal between the annular abutments 16 and 17. Of course, these abutments could be forced into direct contact with each other, but certain advantages can be gained by interposing a removable sealing member, such as a simple gasket, or special orifice plates hereafter described.

Aside from these details, the device includes a suitable coupling means for detachably connecting the telescoping sleeves 11 and 12 of Figures 1 to 7, so as to prevent leakage between the abutments 16 and 17. For example, we have shown a simple coupling band 18 screwed to the sleeves 11 and 12, and will hereafter describe unique details of the threaded connections. However, this is a separate specific detail, and attention is now directed to a novel feature involving a detachable sealing member located in a zone entirely beyond a coupling member which detachably connects the telescoped sleeves.

More specifically stated, the coupling sleeve 12 is provided with a circumferential slot 19 at one side of the rotary coupling band 18 to receive a sealing member in a zone entirely beyond said band. This circumferential slot 19 is shown in Figures 1, 2, 6 and 7. The annular internal abutment shoulder 16 lies at one side of said slot 19, while the end abutment face 17 of the telescoped sleeve 11 lies at the opposite side of said slot. The assembled conditions are shown most clearly in Fig. 2.

In considering specific details, it may be important to observe that various types of sealing devices can be readily inserted through the circumferential slot 19 and into the space between the abutments 16 and 17, and that such devices may extend from the slot 19 without in any way interfering with the rotary coupling member 18, which lies entirely beyond said slot. Figures 2 and 3 show an orifice plate 20 adapted to be detachably secured between the abutments 16 and 17. This plate has orifices 21 and 22 of different diameters for selective variations in orifice metering. Gaskets 23 are preferably located at opposite sides of the plate 20, as shown in Fig. 2.

Under other operating conditions, the user may desire to quickly change from a wide-open condition to a blind condition, or vice versa. In this event, one may conveniently employ a reversible plate of the type shown in Fig. 4, having an opening 24 at one end, and a blind extension at the opposite end.

We will now refer to special details which are quite desirable in a coupling for an orifice metering device. Fig. 7 includes a conventional diagram of an orifice meter 25, and by-pass pipes 26 and 27 leading from said orifice meter to the pipe coupling. These by-pass pipes 26 and 27 extend laterally from the telescoping coupling sleeves 11 and 12, as shown in Fig. 2, and they lie at opposite sides of the detachable orifice plate 20. The sleeve 11 has a threaded opening 28 in its peripheral face to receive the laterally extended by-pass pipe 26. The sleeve 12 has a similar threaded opening 29 for the companion by-pass pipe 27. It may be observed that the pipe 26 from the coupling sleeve 11 extends through a telescoping portion of the sleeve 12. However, this outer sleeve 12 has a relatively large opening 30 to freely receive the pipe 26. In actual practice, this opening 30 is preferably a longitudinal slot merging into the circumferential slot 19.

A separate and distinct feature requiring special consideration appears in the manner in which the coupling band 18 may be associated with other details, so as to operate in zones entirely beyond the planes of the sealing abutments, by-pass pipes, etc. The simple coupling band 18, shown most clearly in Fig. 2, is similar to the hexagonal band of an ordinary pipe union. However, the band 18 positively forces the coupling sleeves toward and away from each other, so as to insure release of a detachable gasket, or the like, in a zone remote from said band.

Specific details of this band 18 include screw threads of relatively large pitch at 31 in Fig. 2 engaged with corresponding threads 32 of the sleeve 12, and threads 33 of less pitch in the band 18 engaged with matching threads 34 on the coupling sleeve 11. To provide for convenience in manufacture, and to avoid confusion in actual use of the coupling, all of these threads of different pitch may be simple standard right-hand threads. They could be all left-hand threads, but this might confuse the operator of the coupling.

The pipe 26 in the slot 30 serves as a spline to prevent independent rotation of the telescoping sleeves. However, this pipe location is a supplemental feature which does not appear in all forms of the invention. A simple means for preventing such independent rotation, while allowing the coupling sleeves to slide toward and away from each other, is shown in Figures 2, 5 and 6. The outer sleeve 12 has a longitudinal groove 35 open at one end to slidably receive a pin or key 36 extending from the sleeve 11.

Attention is now directed to peculiar effects of rotary movements of the coupling band 18 in Fig. 2. This band can be rotated on the small threads 34 so as to move to the left in Fig. 2 until it reaches an extended peripheral abutment 37 on the inner sleeve 11. This travel to the left in Fig. 2 may be a relatively slight distance but it requires a prolonged rotary movement on the small threads 34. During this rotary movement the band 18 also turns on the relatively large threads 32 of the sleeve 12, so as to impart a more rapid movement to said sleeve 12. This sleeve 12 can be thus moved to the right in Fig. 2 until it is released from the coupling band 18.

Study of these conditions will show that the simple rotary coupling band 18, having a non-circular outer face to receive a common wrench, can be readily turned in either direction to positively force the coupling sleeves toward and away from each other. A relatively slight rotary movement of the simple band 18 will release the interposed sealing member between the abutments 16 and 17 and provide for convenient rapid changes from one sealing condition to another. Furthermore, when the coupling band 18 is released from the relatively large threads 32, said band 18 can be rather naturally located in contact with the extended abutment 37 in Fig. 2, so as to provide a desirable starting point for subsequent coupling operations.

In Figures 8 and 9, we have shown a coupling device substantially the same as in Figures 1 and 2, with the exception of extended conditions for the by-pass pipes 26 and 27. Reference characters employed in the previous description have been applied to corresponding details in Figures 8 and 9, so it seems unnecessary to repeat the specific description of these details.

We claim:

1. A pipe coupling comprising companion coupling sleeves adapted to be attached to adjacent ends of pipes, said sleeves being telescoped and splined to each other to prevent independent rotary movement of the sleeves, a coupling band screwed onto the telescoped sleeves, said coupling band having screw threads of relatively large pitch engaged with corresponding threads of the outer sleeve, and threads of less pitch engaged with matching threads of the inner sleeve, so as to positively force said sleeves toward and away from each other in response to selected rotary movements of said coupling band, the outer sleeve being provided with a circumferential slot at one side of said coupling band to receive a sealing member in a zone entirely beyond said band, said outer sleeve also having an annular internal abutment shoulder at one side of said slot, the telescoped inner sleeve being provided with an end abutment face at the opposite side of said circumferential slot, and a removable sealing member movable into and out of said circumferential slot, said sealing member being normally confined between said internal shoulder and said end abutment face, and said inner sleeve having an extended peripheral abutment facing the threaded coupling band to limit the travel of said band in its uncoupling direction.

2. A pipe coupling comprising companion coupling sleeves adapted to be attached to adjacent ends of pipes, said sleeves being telescoped with each other, a coupling band detachably connecting the telescoped sleeves, the outer sleeve being provided with a circumferential slot at one side of said coupling band to receive a sealing member in a zone entirely beyond said band, said outer sleeve also having an annular internal abutment shoulder at one side of said slot, the telescoped inner sleeve being provided with an end abutment face at the opposite side of said circumferential slot, and a removable sealing member movable into and out of said circumferential slot, said sealing member being normally confined between said internal shoulder and said end abutment face.

3. A pipe coupling comprising companion coupling sleeves adapted to be attached to adjacent ends of pipes, said sleeves being telescoped and splined to each other to prevent independent rotary movement of the sleeves, a rotary coupling band screwed onto the telescoped sleeves, said coupling band having screw threads of relatively large pitch engaged with corresponding threads of one of said sleeves, and threads of less pitch engaged with matching threads of the other sleeve, so as to positively force said sleeves toward and away from each other in response to selected rotary movements of said coupling band, the outer sleeve being provided with a circumferential slot at one side of said rotary coupling band to receive a sealing member in a zone entirely beyond said band, said outer sleeve also having an annular internal abutment shoulder at one side of said slot, the telescoped inner sleeve being provided with an end abutment face at the opposite side of said circumferential slot, and a removable sealing member movable into and out of said circumferential slot, said sealing member being normally confined between said internal shoulder and said end abutment face.

4. In a coupling for an orifice metering device of the type including by-pass pipes at opposite sides of an orifice plate, companion coupling sleeves adapted to be attached to adjacent ends of pipes, said sleeves being telescoped with each other and provided with threaded openings in their peripheral faces to receive laterally extended by-pass pipes, the outer sleeve having a relatively large opening to freely receive the by-pass pipe extending laterally from the inner sleeve, a coupling band connecting said telescoping sleeves, said threaded openings for the by-pass pipes being separated from each other in planes entirely beyond said coupling band, the outer coupling sleeve being provided with a circumferential slot in a plane between said threaded openings and an annular internal abutment shoulder at one side of said slot, the telescoped inner sleeve being provided with an end abutment face at the opposite side of said circumferential slot, and a detachable orifice plate movable into and out of said circumferential slot, said orifice plate being normally confined between said internal shoulder and said end abutment face.

5. In a coupling for an orifice metering device of the type including by-pass pipes at opposite sides of an orifice plate, companion coupling sleeves adapted to be attached to adjacent ends of pipes, said sleeves being telescoped with each other and provided with threaded openings in their peripheral faces to receive laterally extended by-pass pipes, the outer sleeve having a relatively large opening to freely receive the by-pass pipe extending laterally from the inner sleeve, a rotatable coupling band detachably connecting said telescoping sleeves, said threaded openings being separated from each other in planes entirely beyond said rotatable coupling band, the outer coupling sleeve being provided with a circumferential slot in a plane between said threaded openings and an annular internal abutment shoulder at one side of said slot, the telescoped inner sleeve being provided with an end abutment face at the opposite side of said circumferential slot, and a detachable orifice plate movable into and out of said circumferential slot, said orifice plate being normally confined between said internal shoulder and said end abutment face.

6. In a coupling device for securing a detachable sealing member, a pair of companion coupling sleeves adapted to be attached to adjacent ends of pipes, said sleeves being telescoped with each other, an internally threaded coupling band surrounding and screwed onto outer peripheral portions of both of the telescoped sleeves, the outer sleeve being provided with an annular internal shoulder facing a telescoped end of its companion sleeve, said outer sleeve also having a circumferential opening between said internal shoulder and said end of the companion sleeve, and a detachable sealing member movable into and out of said circumferential opening, said sealing member being normally confined between said internal shoulder and said telescoped end.

EDDIE M. DONS.
JESSE V. STEVENS.

REFERENCES CITED

The following references are of record in the file of this patent:

UNITED STATES PATENTS

| Number | Name | Date |
| --- | --- | --- |
| 1,589,781 | Anderson | June 22, 1926 |
| 1,633,161 | Cavenagh | June 21, 1927 |
| 2,214,959 | Hamer | Sept. 17, 1940 |